June 15, 1926.

W. A. WILLIAMS 1,588,926

RUBBER PAVING AND FLOORING BLOCK OR SLAB

Filed July 28, 1923

Inventor
William Arthur Williams
By Knight Bros
Attys

Patented June 15, 1926.

1,588,926

UNITED STATES PATENT OFFICE.

WILLIAM A. WILLIAMS, OF EDINBURGH, SCOTLAND, ASSIGNOR TO THE NORTH BRITISH RUBBER COMPANY, LIMITED, OF EDINBURGH, SCOTLAND, A COMPANY OF GREAT BRITAIN.

RUBBER PAVING AND FLOORING BLOCK OR SLAB.

Application filed July 28, 1923, Serial No. 654,462, and in Great Britain January 18, 1923.

This invention relates to paving and flooring blocks or slabs of the kind comprising an earthenware base or backing and a face of vulcanized rubber.

According to the present invention, blocks or slabs of the kind above referred to, are constructed by vulcanizing rubber to the usual plain surface of ordinary bricks or tiles of burnt clay or like earthenware, that is to say, the bricks or tiles are faced with rubber prior to vulcanization thereof and without the provision of a binding around the edges of the brick or tile and without cementing or otherwise securing the rubber to the brick or tile.

The resultant combination can be easily and firmly attached to the road-bed or floor foundation by the commonly known method of employing concrete, cement or pitch, or any other well known method used in road or building construction.

It has been found that to get the best adhesion between the rubber and the brick or tile, a hard or semi-hard rubber mixing should be employed at the part adjacent to the brick or tile, this hard or semi-hard rubber being covered with softer rubber to form the road or floor surface; or the rubber portion of the block or slab may be graded from a hard portion next to the brick or tile to a soft face.

In construction, the different qualities of rubber are built up on the brick or tile in the raw condition, and the whole thereafter vulcanized either with or without pressure to form the completed article.

The accompanying drawing illustrates examples of the improved paving or flooring block.

A is a brick or tile of burnt clay or like earthenware. B is a hard or semi-hard rubber mixture adjacent to the top face of the brick and C is a covering of softer rubber to form the surface.

Claims:—

1. As a new article of manufacture, an earthen base block, and a layer of rubber superposed on a substantially plane face of said block and joined therewith by vulcanization, as and for the purpose described.

2. As a new article of manufacture, an earthen base block, and a layer of rubber superposed on a substantially plane face of said block, said layer comprising a facing portion of soft rubber and a backing portion of relatively hard rubber, said backing portion being joined with the face of said block by vulcanization, as and for the purpose described.

The foregoing specification signed at Edinburgh, Scotland this sixth day of July, 1923.

W. A. WILLIAMS.

Patented June 15, 1926.

1,588,926

UNITED STATES PATENT OFFICE.

WILLIAM A. WILLIAMS, OF EDINBURGH, SCOTLAND, ASSIGNOR TO THE NORTH BRITISH RUBBER COMPANY, LIMITED, OF EDINBURGH, SCOTLAND, A COMPANY OF GREAT BRITAIN.

RUBBER PAVING AND FLOORING BLOCK OR SLAB.

Application filed July 28, 1923, Serial No. 654,462, and in Great Britain January 18, 1923.

This invention relates to paving and flooring blocks or slabs of the kind comprising an earthenware base or backing and a face of vulcanized rubber.

According to the present invention, blocks or slabs of the kind above referred to, are constructed by vulcanizing rubber to the usual plain surface of ordinary bricks or tiles of burnt clay or like earthenware, that is to say, the bricks or tiles are faced with rubber prior to vulcanization thereof and without the provision of a binding around the edges of the brick or tile and without cementing or otherwise securing the rubber to the brick or tile.

The resultant combination can be easily and firmly attached to the road-bed or floor foundation by the commonly known method of employing concrete, cement or pitch, or any other well known method used in road or building construction.

It has been found that to get the best adhesion between the rubber and the brick or tile, a hard or semi-hard rubber mixing should be employed at the part adjacent to the brick or tile, this hard or semi-hard rubber being covered with softer rubber to form the road or floor surface; or the rubber portion of the block or slab may be graded from a hard portion next to the brick or tile to a soft face.

In construction, the different qualities of rubber are built up on the brick or tile in the raw condition, and the whole thereafter vulcanized either with or without pressure to form the completed article.

The accompanying drawing illustrates examples of the improved paving or flooring block.

Figure 1:
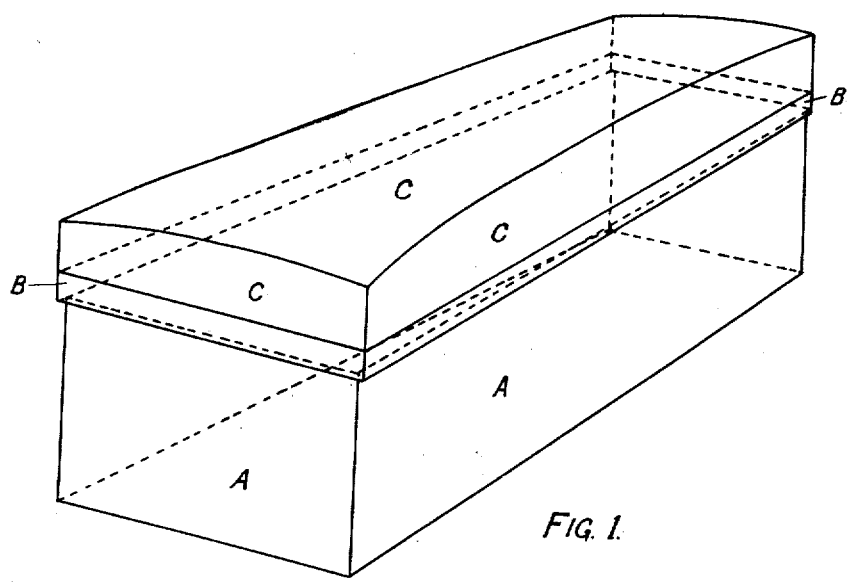
Fig. 1 is an isometric view of one form of block having rubber overlap.

Fig. 1 is an isometric view of one form of block having rubber overlap.

Figure 2:
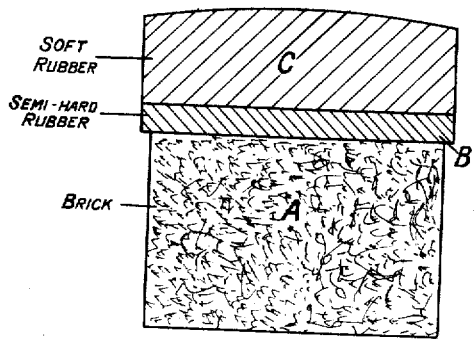
Fig. 2 is a cross-section through the block shown in Fig. 1.

Fig. 2 is a cross-section through the block shown in Fig. 1.

Figure 3:
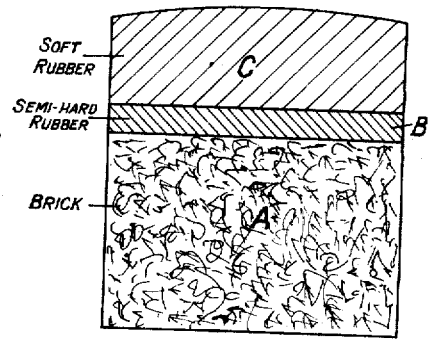
Fig. 3 is a cross-section showing a modification in which the brick and rubber are flush with one another.

Fig. 3 is a cross-section showing a modification in which the brick and rubber are flush with one another.

A is a brick or tile of burnt clay or like earthenware. B is a hard or semi-hard rubber mixture adjacent to the top face of the brick and C is a covering of softer rubber to form the surface.

Claims:—

1. As a new article of manufacture, an earthen base block, and a layer of rubber superposed on a substantially plane face of said block and joined therewith by vulcanization, as and for the purpose described.

2. As a new article of manufacture, an earthen base block, and a layer of rubber superposed on a substantially plane face of said block, said layer comprising a facing portion of soft rubber and a backing portion of relatively hard rubber, said backing portion being joined with the face of said block by vulcanization, as and for the purpose described.

The foregoing specification signed at Edinburgh, Scotland this sixth day of July, 1923.

W. A. WILLIAMS.

Certificate of Correction.

It is hereby certified that in Letters Patent No. 1,588,926, granted June 15, 1926, upon the application of William A. Williams, of Edinburgh, Scotland, for an improvement in "Rubber Paving and Flooring Blocks or Slabs," an error appears in the printed specification requiring correction as follows: Line 64, claim 2, before the word "face" insert the word *unwrought;* and that the said Letters Patent should be read with this correction therein that the same may conform to the record of the case in the Patent Office.

Signed and sealed this 20th day of July, A. D. 1926.

[SEAL.]

M. J. MOORE.
*Acting Commissioner of Patents.*

Certificate of Correction.

It is hereby certified that in Letters Patent No. 1,588,926, granted June 15, 1926, upon the application of William A. Williams, of Edinburgh, Scotland, for an improvement in "Rubber Paving and Flooring Blocks or Slabs," an error appears in the printed specification requiring correction as follows: Line 64, claim 2, before the word "face" insert the word *unwrought;* and that the said Letters Patent should be read with this correction therein that the same may conform to the record of the case in the Patent Office.

Signed and sealed this 20th day of July, A. D. 1926.

[SEAL.]
M. J. MOORE.
*Acting Commissioner of Patents.*